3,391,124
PROCESS FOR THE IONOGENIC OR ANIONIC POLYMERIZATION OF ω-LACTAMS WITH DISPIRO ALKANE DIONES AS ACTIVATORS
Eduard F. J. Duynstee and Johannes van Mourik, Geleen, and Johannes van Beveren, Sittard, Netherlands, assignors to Stamicarbon N.V., Heerlen, Netherlands
No Drawing. Filed Feb. 25, 1965, Ser. No. 435,338
Claims priority, application Netherlands, Mar. 4, 1964, 6402132
13 Claims. (Cl. 260—78)

ABSTRACT OF THE DISCLOSURE

The use of spiro-compounds of the formula:

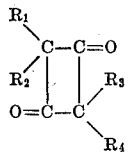

wherein $R_1$ and $R_2$ together, and $R_3$ and $R_4$ together, represent a chain of methylene groups having from 4 to 5 carbon atoms, in the ionogenic polymerization of lactams is disclosed. Polyamide polymers are produced which assume the form of the reaction vessel.

---

The present invention relates to the ionogenic or anionic polymerization of lactams.

Prior to this invention, it has been common knowledge that various lactams may be subject to ionogenic or anionic polymerization, usually carried out with an alkali-metal compound as a catalyst, to form useful polymer products. It has also been known that such process was considerably accelerated by also adding a promoter to the polymerization mixtures. The known promoters used to this end have generally been nitrogen compounds, such as isocyanats, carbodiimides, cyanamides, and, in general, compounds with a tertiary nitrogen atom bound to carbonyl, thiocarbonyl, sulphonyl, or nitroso groups. By the addition of these promoters, the polymerization reaction could be carried out in a short period of time and at temperatures lower than the melting point of the polymer. Thus, from lactam monomers, the molecule of which contains at least 6 carbon atoms in its ring, a solid product can be directly obtained in the shape of the reaction vessel or container in which the polymerization has been carried out.

It has now been discovered and found as provided by this invention that good results are obtained in such a polymerization process in which a lactam or a mixture of lactams is subjected to ionogenic or anionic polymerization if there is used as the promoter a compound having the structure:

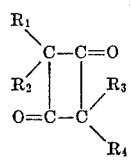

wherein $R_1$, $R_2$, $R_3$ and $R_4$ are the same or different hydrocarbon groups.

In general, hydrocarbon compounds of illustrated cyclobutane-1.3-dione may be used and such compounds also containing halogen, amino or nitro-group substituents. Examples of such compounds are: 2,4-bis(dimethyl) cyclobutane-1.3-dione, 2,4-bis (diethyl) cyclobutane-1.3-dione.

Use is preferably made of cyclic hydrocarbon compounds with the said structure, the so-called spiro-compounds. With the aid of these compounds the polymerization is considerably accelerated and the polyamide is obtained in a very short time, generally in a few minutes only. Examples of these compounds are: dispiro (5.1.5.1) tetradecane-7.14-dione and dispiro (4.1.4.1) dodecane-6.12-dione.

In the above formula, $R_1$, $R_2$, $R_3$ and $R_4$ represent, generally, a lower alkyl hydrocarbon radical, or $R_1$ and $R_2$ together, and $R_3$ and $R_4$ together represent a chain of methylene groups having from 4 to 5 carbon atoms.

In the ionogenic catalytic polymerization of lactams the promoter is used in combination with a catalyst. The well-known catalysts for this polymerization are, for instance: lactam-metal compounds containing a metal atom bound to the nitrogen atom, such as sodium caprolactam, and substances from which, by reaction with lactam, such lactam-metal compounds are formed, for instance, triisopropyl aluminum, diethyl zinc, and alkali-metal alkyls, further alkali metals, alkali-earth metals, and compounds of these metals showing an alkaline reaction, such as hydrides, oxides, hydroxides, and carbonates, and also Grignard compounds, such as alkyl magnesium bromide and aryl magnesium bromide. The particular catalyst used forms no part of this invention. To the contrary, it is a feature of this invention that its advantages may be achieved using any of the conventional known catalysts employed in the ionogenic or anionic polymerization of lactams.

The amount of catalyst used may be varied within wide limits. Usually use is made of 0.1–3 mol. percent with respect to the amount of monomer to be polymerized, but also larger amounts, e.g., 5–10 mol. percent may be used.

It will be appreciated that the catalyst is generally present in an amount corresponding to about between 0.1 and 10 mole percent, although the amount of the catalyst is preferably at most about 3 mole percent.

The amount of promoter to be used in the practice of this invention may also be varied. However, when large amounts of promoter are used, e.g., more than 10 mol. percent, a lower degree of polymerization is obtained than when smaller amounts are used. Accordingly, use of about 0.05–2 mol. percent of promoter, with respect to the lactam, is the presently preferred range of practice of this invention for optimum polymerization results.

It will be appreciated from the above that the promoter is generally added in an amount from about 0.15 to 10 mole percent with respect to the lactam monomer being polymerized.

In carrying out the process of this invention, the lactam monomer may be mixed with the catalyst and the promoter in any simple way. By preference, the lactam is first melted, the catalyst is distributed in the melt, and the mixture is heated to the polymerization temperature, after which the promoter is added with stirring.

The temperature at which the polymerization is carried out may be in the same temperature range of about 90–250° C. that is commonly used for the ionogenic polymerization of lactams. Use is preferably made of an initial temperature of about 90–150° C., while, owing to the exothermic polymerization reaction, the temperature may rise during the reaction, but usually remains below about 200–215° C. At these temperatures, the polymerization is generally completed within an hour, often within half an hour.

As a particular embodiment of the invention, use is made of a temperature lying between the melting point of the lactam monomer and that of the polymer to be obtained, whereby solid macromolecular end products are obtained in the polymerization as shaped products the dimensions of which correspond to those of the reaction vessel or chamber in which the polymerization has been carried out.

The polymerization may be conducted with various omega lactams, such as butyrolactam, caprolactam, oenantholactam, caprylolactam, decyllactam, undecyllactam, or laurinolactam. Mixtures of two, three, or more such lactams may also be copolymerized. If mixtures are copolymerized, copolyamides are obtained, e.g., oenantholactam-caprolactam-laurinolactam copolyamide, laurinolactam-oenantholactam copolyamide, undecyllactam-caprolactam copolyamide, caprolactam-caprylolactam-laurinolactam copolyamide, laurinolactam-caprolactam copolyamide, butyrolactam-caprolactam copolyamide or the like. The structure and the resulting properites of the copolyamides can, of course, be influenced and varied by the composition of the starting mixture of monomers.

The process according to the invention may furthermore be used for the manufacture of dyed or colored products. To this end one or more substances which influence the outward appearance and/or the properties of the polymerization product can be mixed with the starting material in a simple way. For instance, dyestuffs and/or all kinds of fillers, such as wood flour, carborundum, carbon black, powdered shale, coal dust, and coke dust, may be distributed in the lactam melt. Natural and/or synthetic fibres, threads and/or fabrics made thereof may also be processed into the lactam melt. Furthermore, macromolecular products, e.g. polystyrene, polyformaldehyde, polypropylene, polyethylene, and polyamide, and also polycondensation products of aldehydes with phenol, melamine and/or urea may be added to the lactam melt, so that macromolecular products with special properties can be obtained.

The principles and practice of the invention will be further understood by reference to the following example:

EXAMPLE

The polymerization is carried out in a glass cylinder (diameter 2.5 cm.), in which a bar is made. The cylinder is put in an oil bath the temperature of which is maintained at 150° C.

A molten mixture of 30 grams of ε-caprolactam and 0.6 gram of sodium-caprolactam is brought into the cylinder, while a flow of nitrogen is passed through the liquid by means of an inlet tube.

Subsequently, 0.3 mol. percent of dispiro (5.1.5.1) tetradecane-7.14-dione is added as promoter and after 30 seconds the flow of nitrogen is stopped and the inlet tube removed. After 7 minutes the shaped bar is taken from the cylinder.

The process of the above example may also be followed using as the promoter any of the compounds: 2,4-bis (dimethyl) cyclobutane-1.3-dione, 2,4-bis (diethyl) cyclobutane-1.3-dione and dispiro (4.1.4.1) dodecane-6.12-dione.

In each instance a polyamide polymer is obtained.

The invention may, of course, be practiced in specific modes other than those described specifically herein, and this invention is limited only in the spirit and scope of the following claims.

What is claimed is:
1. In the process for the anionic polymerization of omega lactams in the presence of an anionic polymerization catalyst, the improvement which consists essentially in the added presence of a compound, as a promoter, having the formula

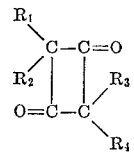

wherein $R_1$ and $R_2$ together, and $R_3$ and $R_4$ together, represent a chain of methylene groups having from 4 to 5 carbon atoms.

2. The process according to claim 1 wherein said polymerization is carried out at a temperature between the melting point of the lactam monomer and the melting point of the polymerization product.

3. The process of claim 1 wherein said lactam is ε-caprolactam.

4. The process of claim 1 wherein said promoter is dispiro (5.1.5.1) tetradecane-7.14-dione.

5. The process of claim 1 wherein said promoter is dispiro (4.1.4.1) dodecane-6.12-dione.

6. The process of claim 1 wherein said promoter is added in an amount of from about 0.05–10 mol. percent with respect to the lactam monomer being polymerized.

7. The process of claim 6 wherein the amount of said promoter is at most about 2 mol. percent.

8. The process of claim 1 wherein a mixture of lactam monomers is employed to produce a copolymer.

9. The process of claim 1 wherein said lactam monomer is selected from the class consisting of butyrolactam, caprolactam, oenantholactam, caprylolactam, decyllactam, undecyllactam and laurinolactam.

10. The process of claim 1 wherein the polymerization is conducted in the temperature range of from about 90 to 250° C.

11. The process of claim 10 wherein said temperature is initially maintained in the range of from about 90 to 150° C.

12. The process of claim 1 wherein said catalyst is present in an amount between about 0.1 and 10 mol. percent.

13. The process of claim 12 wherein the amount of said catalyst is at most about 3 mol. percent.

References Cited

UNITED STATES PATENTS 3,207,729   9/1965   Giberson _____ 260—78

WILLIAM H. SHORT, *Primary Examiner.*

HAROLD D. ANDERSON, *Examiner.*